Patented May 25, 1943

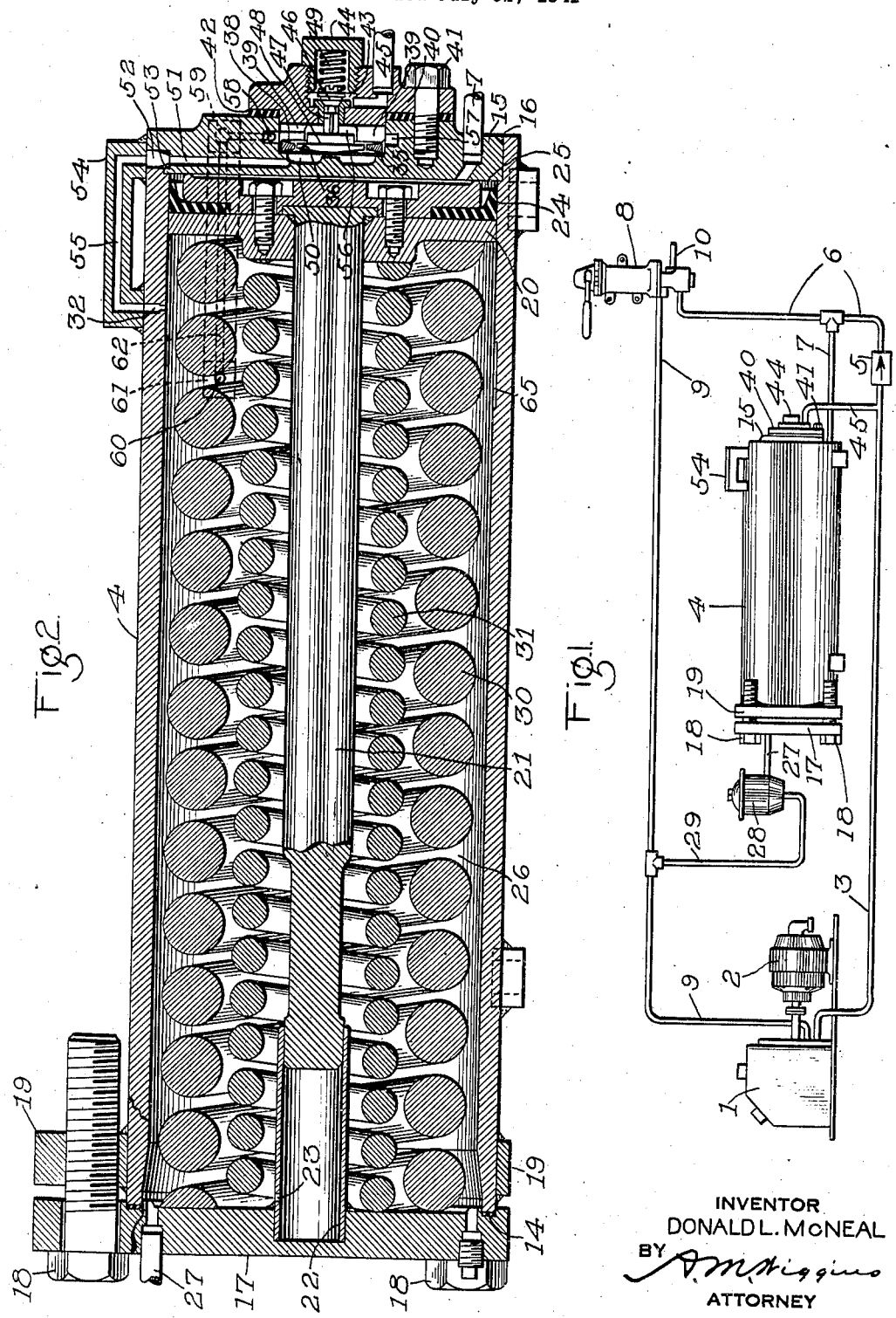

2,319,941

UNITED STATES PATENT OFFICE 2,319,941

BRAKE CONTROL MECHANISM

Donald L. McNeal, Wilkinsburg, Pa.; Ruth H. McNeal, executrix of said Donald L. McNeal, deceased, assignor to The Westinghouse Air Brake Company, Wilmerding, Pa., a corporation of Pennsylvania Application July 31, 1941, Serial No. 404,813

7 Claims. (Cl. 138—31)

This invention relates to fluid pressure brakes and more particularly to a liquid or hydraulic pressure brake for use on motor vehicles or locomotives.

In a hydraulic brake system it is customary to store up a supply of liquid under pressure, in what is commonly known as an accumulator, for use in applying the brakes, and the principal object of the invention is the provision of an improved accumulator for this use.

Other objects and advantages will be apparent from the following more detailed description of the invention.

In the accompanying drawing: Fig. 1 is a diagrammatic view of a hydraulic brake system embodying the improved accumulator; and Fig. 2 is a sectional view taken longitudinally through the accumulator shown in Fig. 1.

In Fig. 1, the reference numeral 1 indicates a liquid supply reservoir or sump adapted to contain a quantity of liquid. In this reservoir is a hydraulic pump (not shown) which in service is adapted to be continuously operated by an electric motor 2 for drawing liquid from said reservoir and then displacing same into a pressure supply pipe 3. An accumulator 4 is connected to pipe 3 through check valve 5 and pipes 6 and 7 and through this communication said accumulator is adapted to be charged with liquid under pressure by the pump, the check valve being provided to prevent back flow of liquid from the accumulator to pipe 3 under a condition to be later described. The pipe 6, which is thus constantly supplied with liquid under pressure from the accumulator 4 is connected to a brake control valve 8 which is manually operative to selectively control communication between the liquid pressure supply pipe 6, a brake release pipe 9 and a pipe 10 which leads to one or more brake cylinders. When the brake valve 8 is operated to connect pipe 6 to pipe 10, liquid under pressure is adapted to be drawn from the accumulator 4 through pipe 6 and be supplied to the brake cylinder or cylinders for applying the brakes on the vehicle, while when the brake valve is operated to connect pipe 10 to pipe 9 liquid under pressure in the brake cylinder or cylinders is adapted to be released into the pipe 9 and returned through said pipe to the sump 1.

The accumulator 4, which embodies the invention, provides a reserve of liquid under pressure which is instantly available to apply the brakes upon suitable operation of the brake valve 8, as will be apparent. Furthermore, the accumulator also is preferably of such capacity as to provide for several applications of brakes without being recharged by the pump, so as to insure adequate braking of the vehicle for a certain period, in case for any reason the pump should fail.

The improved accumulator 4 comprises a casing or cylinder having in one end a counterbore in which is fitted a pressure head 15. This head is secured in place by a seam weld 16, which also acts to provide a leak tight joint between the two parts. A non-pressure head 17 is secured to the opposite end of the cylinder by bolts 18 having screw threaded connections with a suitable ring 19 welded to the cylinder. A gasket 14 is compressed between the non-pressure head 17 and the end of the cylinder to provide a leak tight joint.

A piston 20 is slidably mounted in the cylinder and has a stem 21 projecting from one face and supported at its end in a tube 22 which is secured to the inner face of the non-pressure head 17 and projects into the cylinder in concentric relation with the bore thereof. A port 23 is provided through the sleeve 22 adjacent the inner surface of the non-pressure head 17 to avoid a dash-pot effect upon movement of the piston rod 21 within the sleeve.

The piston 20 has a packing cup 24 so arranged as to prevent leakage of liquid under pressure from a pressure chamber 25 provided at one side of the piston to a non-pressure chamber 26 at the opposite side of the piston. The non-pressure chamber 26 is connected by a pipe 27 to the inlet of a filter 28 having an outlet connected to a pipe 29 which leads to the sump pipe 9 whereby said chamber is in constant communication with the sump 1. The liquid used in this system is preferably oil, and the filter 28 is provided to maintain such oil free of impurities which would in any way interfere with the efficient operation of the system.

In the non-pressure chamber 26 there are two coil springs 30 and 31 encircling the piston rod 21 in concentric relation therewith. One end of these springs bears against the non-pressure head 17 while the opposite ends act on the piston 20 urging same in the direction of the pressure head 15.

Pipe 7 is constantly open to the pressure chamber 25 so that liquid displaced by the pump is adapted to flow to said chamber by way of the check valve 5. When the pressure of the liquid obtained in chamber 25 and acting on one face of the piston 20 overcomes the opposing pressure of the springs 30 and 31 said piston is adapted to be moved in the direction of the left hand, as viewed in the drawing, and this movement is adapted to continue until the piston moves past an unloading port 32 provided through the cylinder wall.

The quantity of liquid obtained in the accumulator between the pressure head 15 and piston 20 when the port 32 is opened to the pressure chamber 25 is intended to be adequate to provide for several applications of the brakes on the vehicle without any further supply from the pump.

In case the pump should not be operating for any reason it will be apparent that as liquid is drawn from the pressure chamber 25 by operation of the brake valve device 8 for applying the brakes, the springs 30 and 31 will move the piston 20 toward the pressure head and maintain the liquid under a pressure determined by the force of the springs. These springs are so designed as to maintain the liquid in chamber 25 at such a pressure as to ensure a safe degree of braking until said piston returns to the position shown. It will therefore be apparent that the springs 30 and 31 must be assembled in the cylinder under a chosen degree of pressure with the piston in contact with the pressure head 15 and this is accomplished by the bolts 18 which are relatively long and thereby provide for compressing the springs during the act of drawing the non-pressure head to its working position shown.

The pressure head 15 has a cavity which is open to the outer face thereof and which near the bottom has an annular shoulder 35. A movable abutment preferable in the form of a flexible diaphragm 36 is disposed in this cavity and is securely clamped around its edge between the shoulder 35 and a ring 38. The ring is forced against the diaphragm by fingers 39 which project inwardly from a cover 40 which closes the open end of the cavity in the pressure head 15 and which is rigidly secured thereto by screws 41. A gasket 42 is clamped between the pressure head 15 and cover 40 to prevent leakage through the joint.

The cover 40 has a chamber 43 the outer open end of which is closed by a cap 44 having screw threaded engagement with the cover. The chamber 43 which is connected by pipe 45 to pipe 3, contains a valve 46 which has a fluted stem 47 extending through a suitable bore in the cover 40 and contacting one side of a follower 48 the opposite side of which bears against the diaphragm 36. In cap 44 is a spring 49 which acts on the valve for urging it to the seated or closed position shown.

At the inner face of the diaphragm 36 is a chamber 50 which is connected by a port 51 extending radially through the pressure head 15 to a bore 52 provided through the cylinder in longitudinal alignment with port 32. The junction of port 51 and bore 52 is made leak tight by a weld 53. An inverted U-shaped member 54 is secured by welding to the outside of the cylinder over the port 32 and bore 52 and has a passage 55 connecting said port and bore, the welds providing leak tight joints between said member and cylinder.

The follower 48 at the outer face of the diaphragm is contained in a chamber 56 which is connected by radial slots provided between the fingers 39 with an annular cavity 57. The pressure head has a radial port 58 connected at one end to cavity 57 while the opposite end opens to a bore 59 in the cylinder, the bore 59 and port 58 being arranged like but spaced circumferentially from the port 51 and bore 52.

Aligned longitudinally of the cylinder with the bore 59 is another bore 60 extending through the cylinder, the bore 60 being so located as to be open to the spring chamber 26 when the piston 20 is in such position as to just open the port 32 to the pressure chamber 25. An inverted U-shaped member 61, like the member 54 but longer, is welded to the outside of the cylinder with its opposite ends over the bores 59 and 60 and has a passage 62 connecting said bores.

*Operation*

In use, when the piston 20 occupies the position shown or as long as the port 32 is open to the spring chamber 26, chambers 50 and 56 at both sides of the diaphragm 36 will be at substantially the same pressure as in the spring chamber 26 and thus in the sump 1. Under this condition the valve 46 will be seated by spring 49.

However when the piston 20 becomes displaced by liquid supplied by the pump 1 through pipe 7 by way of check valve 5 to the position in which port 32 is open to the pressure chamber 25, then liquid under pressure will become effective in diaphragm chamber 50 by way of said port, passage 55, bore 52 and port 51.

When the diaphragm 36 is thus subjected in chamber 50 to the pressure in pressure chamber 25, said diaphragm will be deflected toward the right hand and unseat the valve 46 against the spring 49. Liquid displaced by the pump into the pipe 3 will then flow through pipe 45, past the valve 46 to diaphragm chamber 56 and from said chamber to the sump 1 by way of port 58, bore 59, passage 62 and port 60 to the spring chamber 26 and thence through pipes 27, 29 and 9. The check valve 5 acts at this time to prevent back flow of liquid under pressure from the accumulator pressure chamber 25 to the sump by way of pipes 7, 6, 3 and 45, or in other words the check valve acts to hold the pressure in the accumulator for controlling the brakes under this condition.

When the valve 46 is unseated as above mentioned it will be noted that the pressure in the pump delivery pipe 3 becomes substantially equal to that in the sump. Under this condition the pump will therefore merely idle against substantially no load.

When liquid has been drawn from the pressure chamber 25 for controlling the brakes to an extent which allows springs 30 and 31 to move piston 20 towards the right hand sufficient to open port 32 to the spring chamber 26, the pressure in diaphragm chamber 50 will equalize with that in chamber 56. Spring 49 will then seat valve 46 following which the pump will again operate to pump the liquid through the check valve 5 to replenish the reserve of liquid under pressure in the pressure chamber 25 and move the piston 20 against the springs 30 and 31. This movement will continue until port 32 is again opened to the pressure chamber 25 at which time the valve 46 will be unseated to again unload the pump.

From the above it will be apparent that while the pump runs continuously it will operate against the pressure in the pressure chamber 25 only when the piston 20 is in such position as to provide for closing of the check valve 46. At all other times the pump will merely circulate oil through the sump. This system therefore provides for the proper maintenance at all times of an adequate reserve of liquid under pressure but avoids undue work and wear in the pump and minimizes the consumption of power by the pump operating motor.

Moreover, it will be noted that the unloading diaphragm 36 is subject to the pressure in the pressure chamber 25 only when the piston 20 opens port 32 to said chamber. At all other times the diaphragm is merely subject to sump pressure which minimizes wear and distortion of the diaphragm and thus provides for relatively long diaphragm life.

If, when piston 20 opens port 32 to pressure chamber 25, unloading of the pump does not occur, due for instance to failure of valve 46 to be unseated or due to a clogged port, then the piston 20 will continue to be moved against the springs 30 and 31 by the liquid which the pump will continue to force into the chamber 25. After a slight degree of such movement however, the piston 20 will open a groove 65 in the cylinder wall to the pressure chamber 25 and thus connect said chamber to the non-pressure chamber 26 so as to dissipate liquid under pressure from the pressure chamber to the sump and thereby prevent any further increase in pressure in said chamber by the continued supply from the pump 1. In other words, the groove 65 acting in conjunction with the piston 20 serves as a safety means to limit the reserve pressure obtained in chamber 25 to a certain maximum degree in case of failure of the unloading arrangement including the valve 46 to function as intended.

This improved accumulator will function without servicing for an indefinite period of time. However, in case servicing is needed, the accessibility of the parts is important. It should be noted that the only parts which might need repair or replacement is the diaphragm 36, valve 46 and possibly the packing cup 24. The unloader parts are all contained in the pressure head 15 so that the mere removal of cap nut 44 or cover 40 provides ready access to these parts. In case it should become necessary to replace the packing cup 24, removal of bolts 18 permits the piston to be readily withdrawn from the cylinder.

Summary

It will now be apparent that the improved hydraulic accumulator will operate to maintain a desired reserve of liquid under pressure without unnecessary operation and wear of the continuously operating pump and without undue consumption of power incident to the operation of the pump.

When the desired reserve is obtained the unloading means completely unloads the pump so that it will merely idle against sump pressure. The unloading diaphragm is not subject to pressure except during the unloading operation. Thus the parts should last for a relatively long period of time. In case of failure of any part however it may be readily replaced due to the accessibility thereof.

In case the unloading means should fail for any reason, the pressure in the accumulator will still be held at a safe degree by the safety means including piston 20 and groove 65.

Having now described my invention, what I claim as new and desire to secure by Letters Patent, is:

1. In a hydraulic system including a pipe to which liquid under pressure is adapted to be supplied, an accumulator for receiving and storing liquid under pressure from said pipe, comprising, a cylinder, a pressure head closing one end of said cylinder, a piston slidably mounted in said cylinder and cooperative with said pressure head to form a pressure chamber which is open to said pipe and adapted to receive liquid under pressure from said pipe, spring means associated with said cylinder and acting on said piston determining the pressure of liquid in said chamber and opposing movement of said piston by liquid supplied thereto from said pipe, a flexible diaphragm in said pressure head, a cover removably secured to said head securing said diaphragm in position, said cover having a valve chamber connected to said pipe, a valve in said valve chamber connected to one side of said diaphragm and operative upon supply of liquid under pressure to the opposite side of said diaphragm to open a vent communication from said pipe to release liquid therefrom, a check valve arranged to close communication between said pressure chamber and pipe upon opening of said vent communication, a removable member secured to said cover closing said valve chamber, said piston being operative upon a chosen degree of displacement by liquid supplied to said pressure chamber from said pipe to supply liquid under pressure from said pressure chamber to said opposite side of said diaphragm and to release liquid under pressure therefrom when displaced to any less degree.

2. In a hydraulic system including a pipe to which liquid under pressure is adapted to be supplied, an accumulator for receiving and storing liquid under pressure from said pipe, comprising, a cylinder, a pressure head closing one end of said cylinder, a piston slidably mounted in said cylinder and cooperative with said pressure head to form a pressure chamber which is open to said pipe and adapted to receive liquid under pressure from said pipe, spring means associated with said cylinder and acting on said piston determining the pressure of liquid in said chamber and opposing movement of said piston by liquid supplied thereto from said pipe, a flexible diaphragm in said pressure head, a cover removably secured to said head securing said diaphragm in position, said cover having a valve chamber connected to said pipe, a valve in said valve chamber connected to one side of said diaphragm and operative upon supply of liquid under pressure to the opposite side of said diaphragm to open a vent communication from said pipe to release liquid therefrom, a check valve arranged to close communication between said pressure chamber and pipe upon opening of said vent communication, a removable member secured to said cover closing said valve chamber, said piston being operative upon a chosen degree of displacement by liquid supplied to said pressure chamber from said pipe to supply liquid under pressure from said pressure chamber to said opposite side of said diaphragm and to release liquid under pressure therefrom when displaced to any less degree, the communication between said piston and said opposite side of said diaphragm comprising a passage in said pressure head, a port through said cylinder arranged for control by said piston and a member secured to said cylinder and having a passage connecting said port to the said passage in said pressure head.

3. An accumulator comprising in combination, a cylinder, a pressure head closing one end of said cylinder, a non-pressure head closing the opposite end of said cylinder, a piston slidably mounted in said cylinder and having one side cooperating with said pressure head to form a pressure chamber adapted to receive liquid under pressure from a liquid supply pipe; spring means interposed between said non-pressure head and the opposite face of said piston governing the degree of liquid pressure in said pressure chamber, the chamber containing said spring means constituting a non-pressure chamber open to a liquid sump, a valve in said pressure head operative to open communication between said liquid supply pipe and non-pressure chamber, a check valve arranged to close communication between said pressure chamber and liquid supply pipe upon operation of said valve, a flexible diaphragm in said pressure head operative when subject on one side to liquid under pressure to actuate said valve, said piston being operative upon a chosen degree of movement by liquid under pressure supplied to said pressure chamber to supply liquid under pressure therefrom to said one side of said diaphragm and for all lesser degrees of displacement to open said one side of said diaphragm to said non-pressure chamber.

4. An accumulator comprising in combination, a cylinder, a pressure head closing one end of said cylinder, a non-pressure head closing the opposite end of said cylinder, a piston slidably mounted in said cylinder and having one side cooperating with said pressure head to form a pressure chamber adapted to receive liquid under pressure from a liquid supply pipe; spring means interposed between said non-pressure head and the opposite face of said piston governing the degree of liquid pressure in said pressure chamber, the chamber containing said spring means constituting a non-pressure chamber open to a liquid sump, a valve in said pressure head operative to open communication between said liquid supply pipe and non-pressure chamber, a check valve arranged to close communication between said pressure chamber and liquid supply pipe upon operation of said valve, a flexible diaphragm in said pressure head operative when subject on one side to liquid under pressure to actuate said valve, said piston being operative upon a chosen degree of movement by liquid under pressure supplied to said pressure chamber to supply liquid under pressure therefrom to said one side of said diaphragm and for all lesser degrees of displacement to open said one side of said diaphragm to said non-pressure chamber, the liquid vent communication from said valve to said non-pressure chamber, and the liquid supply communication to said one side of said diaphragm each comprising a passage in said pressure head, a port in said cylinder open to said non-pressure chamber, and a member secured to the exterior of said cylinder connecting the respective passage in said pressure head and port in said cylinder.

5. An accumulator comprising in combination, a cylinder, a pressure head closing one end of said cylinder, a non-pressure head closing the opposite end of said cylinder, a piston slidably mounted in said cylinder and having one side cooperating with said pressure head to form a pressure chamber adapted to receive liquid under pressure from a liquid supply pipe; spring means interposed between said non-pressure head and the opposite face of said piston governing the degree of liquid pressure in said pressure chamber, the chamber containing said spring means constituting a non-pressure chamber open to a liquid sump, a valve in said pressure head operative to open communication between said liquid supply pipe and non-pressure chamber, a check valve arranged to close communication between said pressure chamber and liquid supply pipe upon operation of said valve, a flexible diaphragm in said pressure head operative when subject on one side to liquid under pressure to actuate said valve, said piston being operative upon a chosen degree of movement by liquid under pressure supplied to said pressure chamber to supply liquid under pressure therefrom to said one side of said diaphragm and for all lesser degrees of displacement to open said one side of said diaphragm to said non-pressure chamber, said spring means being under pressure when said pressure chamber is void of liquid under pressure, and relatively long securing bolts removably securing said non-pressure head to said cylinder and arranged to have connection with said cylinder when said spring means is free so as to compress said spring means in the act of securing said non-pressure to said cylinder.

6. An accumulator comprising in combination, a cylinder, a pressure head closing one end of said cylinder, a non-pressure head closing the opposite end of said cylinder, a piston slidably mounted in said cylinder and having one side cooperating with said pressure head to form a pressure chamber adapted to receive liquid under pressure from a liquid supply pipe; spring means interposed between said non-pressure head and the opposite face of said piston governing the degree of liquid pressure in said pressure chamber, the chamber containing said spring means constituting a non-pressure chamber open to a liquid sump, a cover removably secured to said pressure head, a flexible diaphragm in said pressure head removably secured thereto by said cover, a check valve in the communication between said pressure chamber and supply pipe arranged to prevent flow of liquid under pressure from said pressure chamber to said supply pipe, a cap removably secured to said cover closing one end of a valve chamber connected to said supply pipe ahead of said check valve, a valve in said valve chamber controlling communication therebetween and a relief chamber at one side of said diaphragm which is connected to the non-pressure chamber in said cylinder, said diaphragm having at the opposite side an actuating chamber, a port in said cylinder connected to said actuating chamber and so arranged as to be opened by said piston after movement by a chosen degree of liquid under pressure supplied to said pressure chamber for supplying liquid under pressure to said actuating chamber for operating said diaphragm to actuate said valve to open the communication controlled thereby, said piston being operative to open said port to the non-pressure chamber thereof for all lesser degrees of liquid under pressure in said pressure chamber.

7. In combination, an accumulator comprising a cylinder, a piston slidably mounted therein, a pressure head closing one end of said cylinder and having connection with a supply pipe through which liquid under pressure is adapted to be supplied to one side of said piston, a non-pressure head adapted to engage the opposite end of said cylinder, spring means in said cylinder interposed between said non-pressure head and piston for opposing movement of said piston by liquid under pressure supplied to said pressure chamber, means removably securing said non-pressure head to said cylinder and adapted to have a securing connection therewith when said spring means is free and operative to move said non-pressure head into engagement with said cylinder and at the same time to compress said spring means, a cover removably secured to said pressure head, a flexible diaphragm clamped between said cover and pressure head, said cover having a valve chamber open to a relief chamber at one side of said diaphragm, a valve in said valve chamber having a stem contacting said diaphragm and arranged to control communication between said valve chamber and relief chamber, a cap removably secured to said cover providing for assembling of said valve in its chamber, a spring acting on said valve urging same to close communication between said valve chamber and relief chamber, a check valve arranged to prevent flow of liquid from said pressure chamber to said supply pipe, said valve chamber being connected to said supply pipe ahead of said check valve, a port in said cylinder in constant communication with said non-pressure chamber, an element carried by said cylinder providing communication between said valve chamber and said port, another port in said cylinder so arranged as to be opened to said pressure chamber by said piston after a chosen degree of movement of said piston by liquid under pressure supplied to said pressure chamber and adapted at all other times to be open to said non-pressure chamber, another element carried by said cylinder providing communication between said other port and the other side of said diaphragm, said diaphragm when subject to liquid under pressure from said pressure chamber being operative to open said valve, and said spring being operative to close said valve when said other side of said diaphragm is open to said non-pressure chamber.

DONALD L. McNEAL.